(No Model.)
P. B. DELANY.
TELEGRAPHY.
No. 381,764. Patented Apr. 24, 1888.
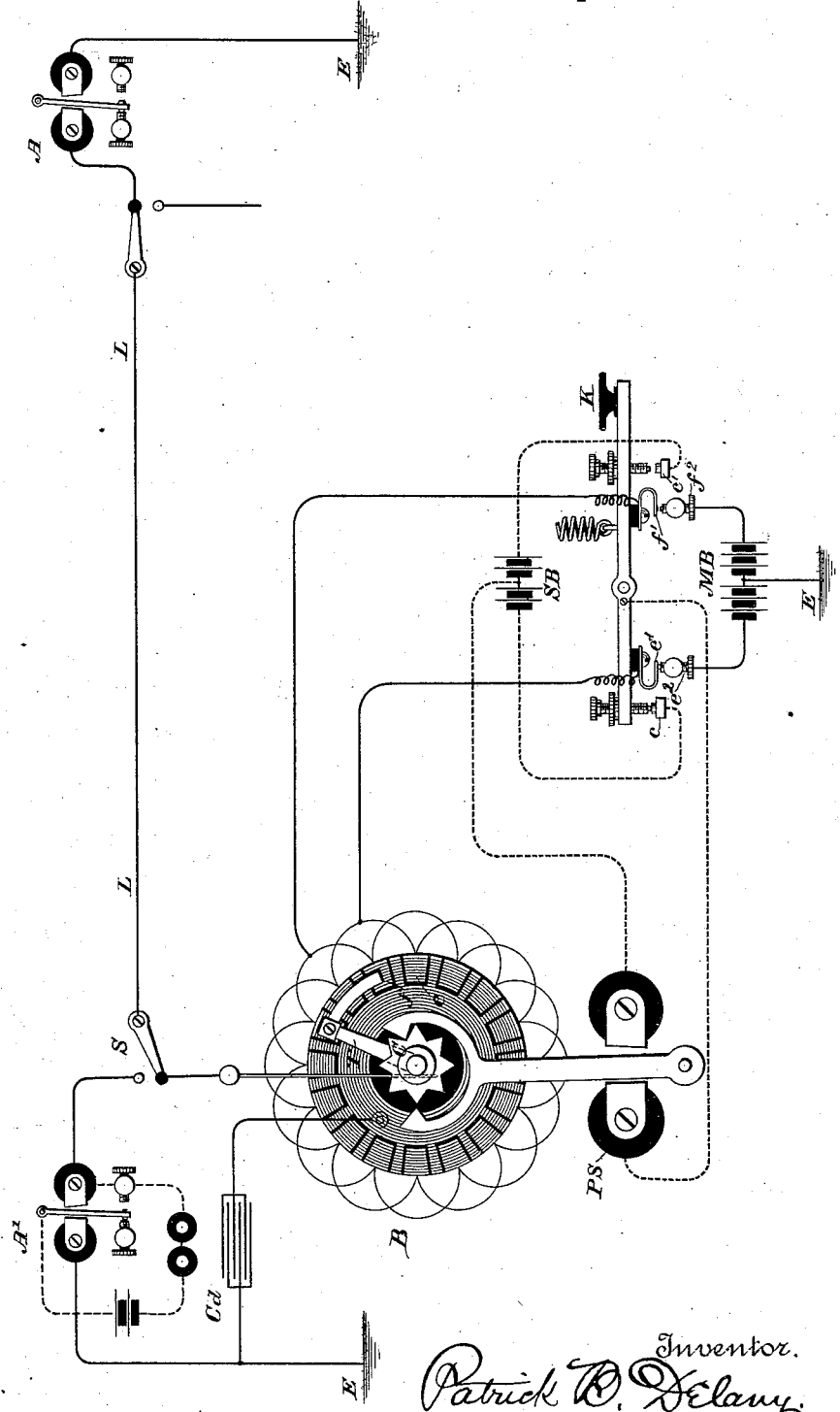
Witnesses.
Geo. W. Breck.
Edward Thorpe.
Inventor.
Patrick B. Delany.
By his Attorneys
Baldwin & Davidson

UNITED STATES PATENT OFFICE.

PATRICK BERNARD DELANY, OF NEW YORK, N. Y.

TELEGRAPHY.

SPECIFICATION forming part of Letters Patent No. 381,764, dated April 24, 1888.

Application filed December 17, 1887. Serial No. 258,178. (No model.)

*To all whom it may concern:*

Be it known that I, PATRICK BERNARD DELANY, of New York city, State of New York, have invented certain new and useful Improvements in Telegraphy, of which the following is a specification.

In Letters Patent granted to me November 29, 1887, Nos. 373,967 and 373,968, I have shown a system of telegraphy in which currents of equal duration and alternating polarity are sent over the line by the manipulation of a Morse key, the currents being transmitted through a trailer traversing a circle of insulated segments, the alternate segments of which are connected with sources of electricity of opposite polarity, and the trailer caused to cross one of said segments each time the key is moved from one of its stops to the other. The system is fully described in said patents and needs no description here. I have found that in working over very long cables or undergound lines that the period of contact while the trailer is crossing a segment may be too brief to fully charge the line.

The primary object of the present invention is to improve the working of my system in this regard.

The invention embodied in one practical form is shown in the accompanying diagrammatic drawing.

A represents an ordinary polarized receiving-relay at a distant station, and L a line or cable running to a switch, S, at the receiver, by means of which the line may be connected either to the receiving-relay A', or, as shown, to the contact-maker or trailer T, which traverses the table of contacts B. The trailer is carried by the spindle of a star-wheel, C, driven by the forked or pallet end of the armature of a polarized sounder, P S, operated by a split battery, S B, having its poles respectively connected with front and back stops, $c\ c'$, of the key K, and its middle connected with the body of the key through the coils of the sounder. As the key is manipulated, the polarity of the current traversing the sounder-coils will be reversed once when the key is depressed and once when it is raised, and the trailer will be driven step by step around the circle of segments. In the circle are two sets of transmitting-segments, $e$ $f$, arranged alternately with reference to each other, and respectively connected with insulated yielding contacts $e'\ f'$ on the key, working against adjustable stops $e^2\ f^2$, respectively connected with opposite poles of a split main battery, M B. Normally, or in either the up or down position of the key, the trailer rests upon a transmitting-segment, $e$ or $f$; but when the key is up, as shown, and the main battery connected with the segments $e$ the trailer is on a segment, $f$, and when the key is held down and the main battery connected with the segments $f$ the trailer will be at rest upon a segment, $e$. The intermediate segments, $g$, arranged between the segments $e\ f$, are all connected to earth through a condenser, Cd, for the purpose of sending a counter-current to line to neutralize the static or return current.

The operation is as follows: Assuming the parts to be in the position illustrated, as the key is depressed the polarized sounder local battery-circuit is opened at $c$, the main battery disconnected from the segments $e$ by the opening of the contacts $e'$ and $e^2$, the main battery sent to line through the contacts $f'\ f^2$ and segment $f$, upon which the trailer is at rest, and, finally, by completing the local circuit at $c'$ the polarized sounder is energized and the trailer moved from $f$ across $g$ and caused to pause on segment $e$, from which the main battery is now disconnected. A similar operation occurs upon the opening of the key. There is, as will be seen, an ample period of contact between the battery and line to transmit a proper impulse, and the duration of the impulse may be varied by means of the adjustable contacts $e^2 f^2$. The line is always connected by means of the trailer or suitable contact-maker with the segment from which a given impulse is to be sent, and is only disconnected and transferred to the other segment after the impulse has passed into the line; or, in other words, the signal impulses are sent into the line from the key, and the moving contact-maker transfers the line from one point of the key to the other in advance of the movement imparted to the key by the operator. Obviously the currents transmitted will be of equal duration, though of alternating polarity.

The trailer in passing from either a segment

*e* or *f* will bridge to the segment *g*, charging the condenser, which sends a counter-impulse into the line while the trailer is crossing the segment. The operation of the condenser is the same as set forth in my patents above mentioned.

So far as I am aware I am the first to use a key controlling front and rear battery-contacts in connection with a trailer, segments connected with the battery, and trailer-moving devices controlled by the key to move the trailer from one segment to another after the trailer has been connected with the battery by the depression or elevation of the key.

I claim as my invention—

1. The combination, substantially as set forth, with a key, of contacts or segments respectively connected through contacts controlled by the key with sources of electricity of opposite polarity, a trailer or contact-maker normally resting upon one of said segments, and trailer-moving devices operated by the manipulation of the key, for the purpose described.

2. The combination of a key, the interposed line-transferring devices consisting of the contacts *e*, connected through a back contact of the key with a source of electric energy, the contacts *f*, connected through a front contact of the key with a source of electric energy of opposite polarity, the trailer resting upon a contact, *f*, when the key is raised, and trailer-actuating devices controlled by the key, whereby upon the movement of the key an impulse is first sent into the line through the segment *f*, and the trailer then moved from *f* to *e*, and so on, substantially as set forth.

3. The combination, substantially as set forth, of the Morse key, the trailer, the segments *e* and *f*, traversed by the trailer and respectively connected through contacts on the key with sources of electricity of opposite polarity, the polarized sounder and its trailer-driving mechanism, which operates the trailer step by step and moves it from one of said segments to another at each movement of the key, the battery, and circuit of said sounder and its contacts controlled by the key.

4. The combination, substantially as set forth, of the key, the line, a trailer connected therewith, the segments *e f*, upon which the trailer pauses, and which are respectively connected with sources of electricity of opposite polarity through contacts controlled by the key, the trailer-actuating devices, also controlled by the key, which move the trailer from one of said segments to another upon each movement of the key, and the intermediate contacts, *g*, connected to earth through a condenser.

5. The combination, substantially as set forth, of a line and split battery or sources of electricity of opposite polarity, both normally disconnected from the line, a key interposed between the battery and line, battery and line contacts for each side of the battery placed at front and back of key, whereby one pole of the battery is put to line when the key is depressed and the other pole when the key is raised, and line-disconnecting devices consisting of contacts and a contact-maker operated by the key, whereby when the key is depressed or raised and an impulse sent into the line the battery is disconnected from the line, for the purpose set forth.

6. The combination of the key, a battery, contacts or segments respectively connected with the battery through contacts controlled by the key, a trailer or contact-maker, and trailer-moving devices operated by the manipulation of the key to move the trailer to the next segment after it has been connected with the battery through one of said segments either by the depression or elevation of the key.

7. The combination of a battery, a key, its front and rear battery-contacts, segments respectively connected with the battery through said front and rear contacts, a trailer normally resting upon one of said segments, and trailer-moving devices operated by the manipulation of the key to move the trailer to the next segment after it has been connected with the battery upon the depression or elevation of the key, whereby the trailer is placed in communication with the battery for practically uniform periods upon the depression and elevation of the key.

In testimony whereof I have hereunto subscribed my name.

PATRICK BERNARD DELANY.

Witnesses:
EDWARD C. DAVIDSON,
FRANCES M. H. GIBBS.